(12) United States Patent
Smeets et al.

(10) Patent No.: US 6,769,062 B1
(45) Date of Patent: Jul. 27, 2004

(54) METHOD AND SYSTEM OF USING AN INSECURE CRYPTO-ACCELERATOR

(75) Inventors: Ben Smeets, Lund (SE); Michael Kornby, Cary, NC (US); Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 821 days.

(21) Appl. No.: 09/695,958

(22) Filed: Oct. 25, 2000

(51) Int. Cl.$^7$ .............................................. G06F 17/00
(52) U.S. Cl. .................... 713/189; 713/193; 713/150
(58) Field of Search ................................ 713/160–163, 713/189–194, 200–202

(56) References Cited

U.S. PATENT DOCUMENTS

| | | | |
|---|---|---|---|
| 6,678,825 B1 * | 1/2004 | Ellison et al. .............. | 713/200 |
| 6,684,330 B1 * | 1/2004 | Wack et al. ................ | 713/162 |
| 6,701,433 B1 * | 3/2004 | Schell et al. ................ | 713/189 |

FOREIGN PATENT DOCUMENTS

| WO | WO99/35782 | 7/1999 |
|---|---|---|

OTHER PUBLICATIONS

Goodman et al., An energy–efficient IEEE 1363–based reconfigurable public–key cryptography processor, Solid–State Circuits Conference, 2001, Digest of Technical Papers, ISSCC, 2001, IEEE International, Feb. 5–7, 2001, pp. 330–331, 461.*

Kim et al., A compact finite processor over GF(2/sup m/) for elliptic curve cryptography, Circuits and Systems, 2002, ISCAS 2002, IEEE International Symposium on, vol. 2, May 26–29, 2002, pp.II–340–II–343, vol. 2.*

Posch et al., Residue number systems: a key to parallelism in public key cryptography, Parallel and Distributed Processing, 1992, Proceedings of the Fourth IEEE Symposium on, Dec. 1–4, 1992, pp. 432–435.*

Kato T. et al., "A Design for Modular Exponentiation Coprocessor in Mobile Telecommunication Terminals," Cryptographic Hardware and Embedded Systems, $2^{nd}$ International Workshop, Aug. 17–18, 2000, CHES 2000, vol. 1965, pp. 216–228.

* cited by examiner

*Primary Examiner*—David Jung
(74) *Attorney, Agent, or Firm*—Coats & Bennett, P.L.L.C.

(57) ABSTRACT

A method and system for performing cryptographic calculations on a bitstring using secret information. A cipher key is manipulated to obtain a modified cipher key. An indicator word is generated that corresponds to the modified cipher key and includes a plurality of indicator bits. A first product is computed with an insecure processor as a function of the bitstring and the modified cipher key. A second product is computed with a secure processor as a function of the bitstring and the indicator. A final product is then computed as a function of the first and second products.

22 Claims, 7 Drawing Sheets

$K_{PRIV}$ = 1 0 1 1 1 = 23

$K_{PRIVM}$ = 1 0 0 0 1 = 17

INDIC. = 0 0 1 1 0 = 6

X = 1 1 0 0 1 = 25

| | $K_{PRIVM}$ | $X_n$ | Z START | Z END | INDIC |
|---|---|---|---|---|---|
| LSB | 1 | 25 | 1 | 25 | 0 |
| | 0 | 625 } $P_2$ | 25 | 25 | 1 |
| | 0 | 390,625 | 25 | 25 | 1 |
| | 0 | $1.53 \times 10^{11}$ | 25 | 25 | 0 |
| MSB | 1 | $2.32 \times 10^{22}$ | 25 | $5.8 \times 10^{23}$ $P_1$ | 0 |

$P_1 \times P_2 = 1.42 \times 10^{32}$ $X^{K_{PRIV}} = 25^{23} = 1.42 \times 10^{32}$

FIG. 5

$K_{PRIV}$ = 1 0 1 1 1 = 23

$K_{LONGM}$ = 1 0 0 0 0 = 16

$K_{SHORT}$ = 0 0 0 1 1 = 3

INDIC. = 0 0 1 0 0 = 4

X = 1 1 0 0 1 = 25

| | $K_{LONGM}$ | $X_n$ | Z START | END | INDIC |
|---|---|---|---|---|---|
| LSB | 0 | 25 | $\boxed{15{,}625}\ P_3$ | 15,625 | 0 |
| | 0 | 625 | 15,625 | 15,625 | 0 |
| | 0 | $\boxed{390{,}625}\ P_2$ | 15,625 | 15,625 | 1 |
| | 0 | $1.53 \times 10^{11}$ | 15,625 | 15,625 | 0 |
| MSB | 1 | $\boxed{2.32 \times 10^{22}}\ P_4$ | 15,625 | $\boxed{3.64 \times 10^{26}}\ P_1$ | 0 |

$P_1 = P_3 \times P_4 = 3.64 \times 10^{26}$ $P_F = P_1 \times P_2 = 1.42 \times 10^{32}$

*FIG. 7*

METHOD AND SYSTEM OF USING AN INSECURE CRYPTO-ACCELERATOR

BACKGROUND OF THE INVENTION

The present invention relates to cryptographic methods and, more particularly, to a method and system of using secure and non-secure processors to perform cryptographic calculations while maintaining the security of private data.

The Internet has evolved from a network used primarily for the exchange of information into a communications medium used for business and commercial transactions. This evolution of the Internet into a communication medium for business and commercial transactions has lead to the need to make communications over public networks secure. Encryption technology is now commonly used to maintain secure communications over insecure networks, such as the Internet. In addition, the growth of e-commerce has lead to a need for new authentication methods for remote log-in and document verification.

Public key encryption technology provides both security and authentication capability. In public key cryptosystems, each user holds a matched pair of keys, including a private key and a public key. The private key and public key form a unique, matched pair. Documents or communications encrypted with a private key can only be decrypted with the matched public key and vice versa. The public key may be publicly disclosed and can be used by anyone to encrypt communications intended for the owner of the public key. The private key is maintained secret. Thus, a communication encrypted with the public key can only be decrypted by the owner of the matching private key.

Public key encryption methods can also be used to create digital signatures for electronic documents and communications. This digital signature may be used to verify documents. A person may sign an electronic document or communication by encrypting the document or communication with his or her private key. A signed document can then be verified or authenticated by decrypting the signed document with the matching public key. If the document or communication decrypts successfully using the matched public key, only the owner of the private key could have sent the message.

To ensure the integrity of commercial transactions and to prevent fraud, it is necessary for users to keep their private keys secret. Anyone who has access to the private key of a user can masquerade as that user with complete anonymity. Thus, widespread use of digital signatures for electronic commerce and other applications will require technology for secure storage of private keys.

It is known to store private keys in tamper-proof hardware devices, such as a removable smart card. The user's private key and public key certificate are written into the memory of the smart card. To use the smart card, the user inserts the smart card into a card reader connected to a host device and then enters an ID/password to activate the smart card. If the correct ID/password is entered, the on-card processor releases the private key for use by the host device. If an incorrect ID/password is entered on a predetermined number of consecutive attempts, the smart card locks up permanently. Some intelligent smart cards (often called cryptocards) can perform cryptographic operations so that the private key does not need to be output from its tamper-proof environment. The bytes to be processed are input to the smart card by the host device and processed by the smart card. Only the result is output from the smart card to the host device.

BRIEF SUMMARY OF THE INVENTION

The present invention is directed to a method and system of using secure and non-secure devices for performing cryptographic calculations, such as encryption and decryption of messages, without disclosing secret information. At least a portion of secret information is maintained within the secure device. The secret information is not discoverable by any practical means from the disclosed portion of the secret information.

One embodiment includes a method and system for performing calculations on a bitstring using a secret cipher key. The cipher key is divided into two partial values, referred to herein as the modified cipher key and the indicator. The modified cipher key is then output to an external processor. The modified cipher key may be generated by randomly changing selected bits of the cipher key. An indicator corresponding to the modified cipher key is also generated and includes a plurality of indicator bits. The indicator is a bitstring that, when added to the modified cipher key, produces the original cipher key. A first product is computed by the insecure processor and is a function of the bitstring and the modified cipher key. A second product is computed within the secure processor and is a function of the bitstring and the indicator. A final product is computed within the secure processor by combining the first product and the second product.

A second embodiment of the present invention divides the cipher key into three partial values, referred to herein as the short part, modified long part, and indicator. The insecure processor computes a first product which is combined with a second product computed by the secure processor. The first product is a function of a third product computed by the secure processor and a fourth product. The secure processor initially computes the third product and outputs the result to the insecure processor. The third product is a function of the bitstring and short part of the cipher key. The fourth product is a function of the bitstring and modified long part of the cipher key. The insecure processor multiplies the third product by a fourth product to obtain the first product. The first product is input to the secure processor which computes a second product and combines the second product with the first product to obtain the final product. The second product is a function of the bitstring and indicator.

BRIEF DESCRIPTION OF THE DRAWINGS

FIG. 5 is a diagram illustrating an exemplary calculation according to the present invention.

FIG. 7 is a diagram illustrating an exemplary calculation according to the second embodiment.

DETAILED DESCRIPTION OF THE INVENTION

Figure 1:
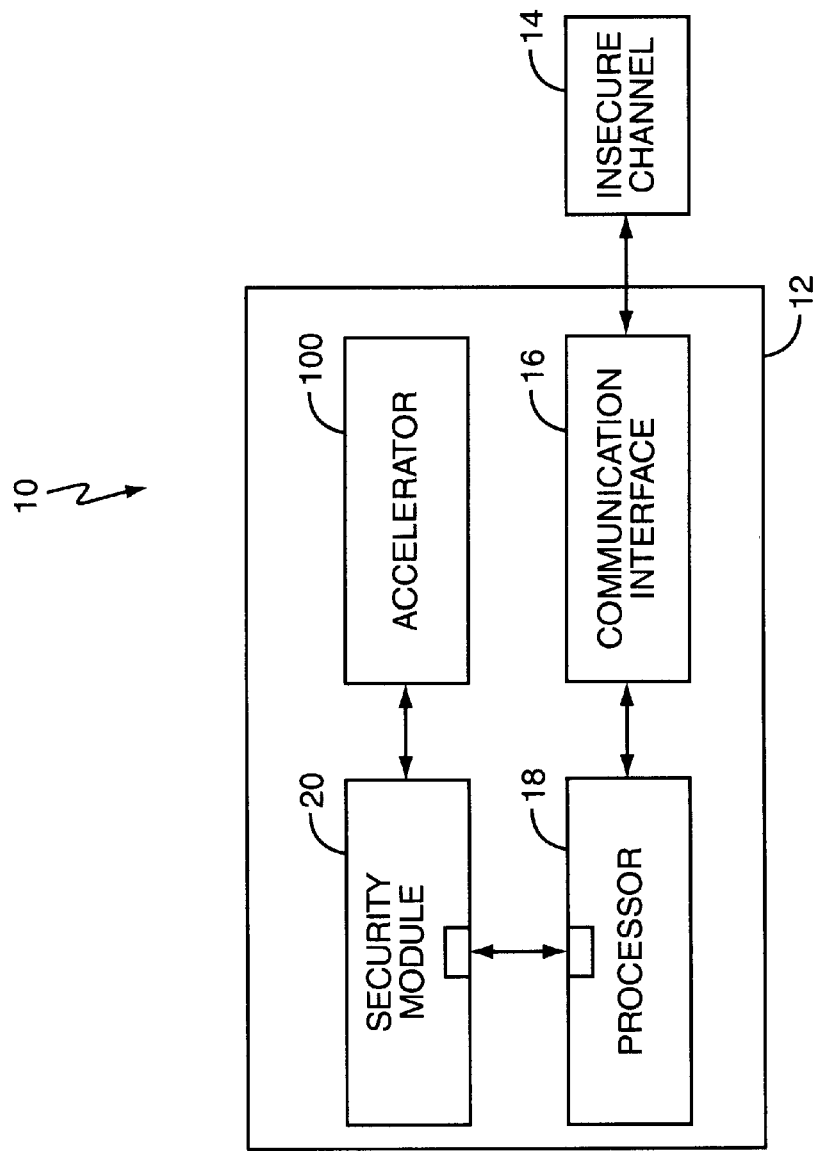
FIG. 1 is a schematic diagram illustrating a communication terminal according to th present invention for communicating over an insecure communications channel.

Referring now to the drawings, FIG. 1 shows a communication terminal 10 for sending and receiving encrypted messages over an insecure communications channel 14. The term "communication terminal" as used herein refers to any device capable of transmitting and/or receiving information over a communication channel 14. The communication channel 14 may be a wireline channel or a wireless channel. Communication terminal 10 may, for example, comprise a cellular radiotelephone; a Personal Communications System (PCS) terminal that may combine a cellular radiotelephone with data processing, facsimile and data communications capabilities; a Personal Digital Assistant (PDA) that may include a radiotelephone, pager, Internet/intranet access, Web browser, organizer, calendar and/or a global positioning system (GPS) receiver. The term communication terminal 10 also encompasses computing devices, such as a personal computer, laptop computer, or palmtop computer, that include a communications interface for communicating with other devices.

Communication terminal 10 includes a communication interface 16, processor 18, security module 20, and an insecure processor referred to herein as accelerator 100. Processor 18 controls the operation of the communication terminal 10 and may include either internal or external memory for storing control programs and data used during operation. Processor 18 may also be used to perform computational functions during the encryption and decryption steps of a communications session. Processor 18, however, is not a secure device such that data stored therein may be susceptible to discovery by outside parties.

Communication interface 16 provides a means for interfacing the communication terminal 10 with the communication channel 14. Interface 16 may have a variety of embodiments, including a radio frequency transceiver, Ethernet interface, modem, etc.

Security module 20 is used to perform cryptographic calculations, e.g. encryption and decryption, and other security functions. Security module 20 may, for example, be a removable smart card that is covered by an upper metalization layer to prevent probing internal nodes for the illicit purpose of extracting stored secret information, such as a private key. Data computed and stored within the security module 20 cannot be accessed by an outside source, thus providing security for the ciphering process. Security module 20 stores encryption variables, such as the public and private keys of the user, used in ciphering algorithms to encrypt and decrypt data. While shown in FIG. 1 as a separate device, the security module 20 may in fact be incorporated into secure portions of processor 18.

Accelerator 100 is a co-processor used to speed up cryptographic calculations performed by security module 20. Accelerator 100 is external to the security module 20 and need not be a secure processor. The function of the accelerator 100 may be performed by or incorporated into processor 18. The present invention allows accelerator 100 to carry out cryptographic calculations without exposing secret information. Accelerator 100 is described in greater detail below.

Figure 2:
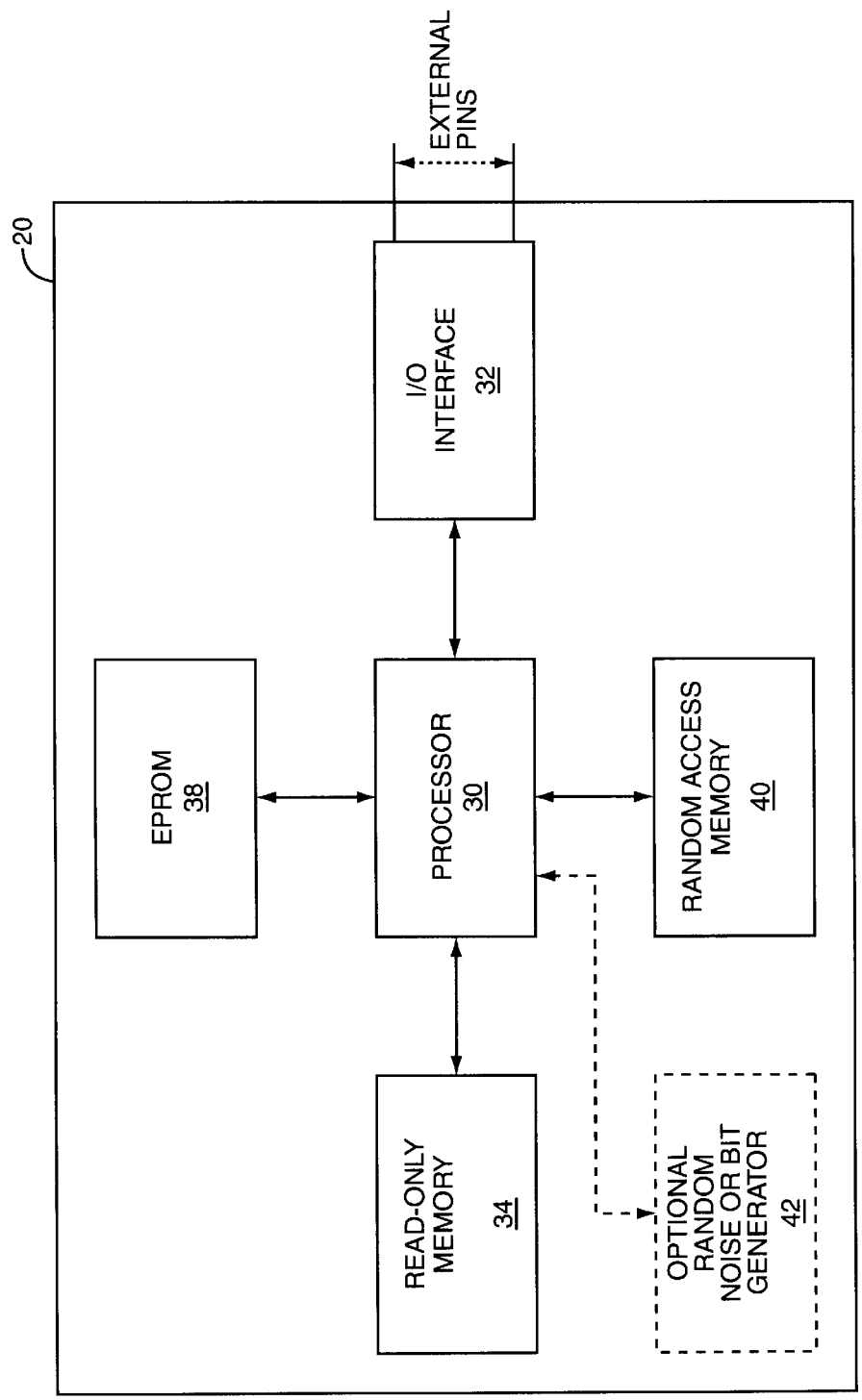
FIG. 2 is a schematic diagram of a security module used in the communication terminal of FIG. 1.

FIG. 2 illustrates the security module 20 in more detail. Security module 20 includes a secure processor 30, I/O interface 32, read-only memory (ROM) 34, erasable programmable read-only memory (EPROM) 38, random access memory 40 and optionally a random number generator 42. I/O interface 32 interfaces the security module 20 with the main processor 18 of the communication terminal 10. Secure processor 30 executes programs stored in ROM 34 and responds to commands presented to the secure processor 30 on I/O interface 32. Commands may include requests to encrypt or decrypt data using stored keys or externally supplied keys and to return the results as output bits to the I/O interface 32.

ROM 34 stores programs that are used for encryption, decryption, and other security functions. The programs should be unalterable to prevent tampering. Other data which may be user specific, such as public and private keys, modulus, and identity certificate, is field programmable and is stored in EPROM 38. The private key $K_{PRIV}$ should be stored in a manner that prevents access from outside sources. A related U.S. Patent Application entitled "Secure Storage of Ciphering Information Using a PIN Code", being filed simultaneously with this application, describes one method of storing the private key in a scrambled or deficient way that prevents usage unless a correct user-supplied password is entered. That application is incorporated herein by reference. RAM 40 provides a working memory for storing data variables temporarily.

Security module 20 may also include a random number generator 42 that can be used to generate random numbers. The random numbers can be used, for example, to compute keys, or to generate random bitstrings for key exchange algorithms, as well as for other purposes well-known in the art.

Data transmitted from, and received by, the communication terminal 10 may be encrypted to protect it from disclosure to third parties. Encryption and decryption may be performed using public key algorithms. A common public key algorithm is the RSA algorithm. The RSA algorithm and other public key algorithms use a first key, called the public key, for encryption operations, and a corresponding second key, called the private key, for decryption operations. The public key and private key form a matched pair. A message encrypted with the public key can be decrypted only with the matching private key. Therefore, to engage in secure communications, the sender encrypts the message using the recipient's public key. Only the intended recipient can decipher the message using the corresponding private key. The RSA algorithm is disclosed in U.S. Pat. No. 4,405,829, which is incorporated herein by reference.

In the RSA algorithm, an information sequence or message is divided into a plurality of message blocks. Each message block comprises a sequence of bits having a value of 1 or 0 which may be viewed as a binary number X. Encryption is performed by exponentiating the binary number X (i.e., the binary value of the message block) using the public key $K_{PUB}$ or private key $K_{PRIV}$ as the exponent and reducing the result modulo the associated encryption modulus N. In general, the recipient's public key $K_{PUB}$ is used to encrypt a message that is to remain secret, and the recipient's private key $K_{PRIV}$ is used to decrypt the enciphered message. In some circumstances, a message block can be encrypted with the sender's private key $K_{PRIV}$ to, in effect, sign the message. In this case, the resulting signed message is decrypted with the sender's public key $K_{PUB}$ to recover the original plaintext.

In the RSA algorithm, the private key $K_{PRIV}$ typically has a length of approximately 2,048 bits. The message block and encryption modulus N are typically in the same order of word length. Thus, encryption or decryption with the private key KPRIV involves exponentiating a 2,048 bit message block with a 2,048 bit exponent and reducing the result modulo another 2,048 bit number. These calculations require significant computational power to perform.

Two algorithms have been used in the past to reduce the complexity of encrypting and decrypting message blocks with a key having a large binary value. One algorithm, referred to herein as the Successive Squares Algorithm, is used to raise a first large number to the power of a second large number. The second algorithm, referred to herein as the Modulo Reduction Algorithm, is used to reduce a first large number modulo a second large number. Both of these algorithms are employed in modified form in the present invention.

The Successive Squares Algorithm is used to raise a bitstring X to a large power Y. In decryption, the bitstring X is the enciphered message and the power Y is the decryption key. In encryption, the bitstring X is the plaintext message block and the power Y is the encryption key. The successive squares of the bitstring X are computed and used to multiply an accumulated value Z depending on the value of a corresponding bit in the power Y. The successive squares are denoted herein as $X_1=X^1, X_2=X^2, X_3=X^4, \ldots X_n=X^2$. In the Successive Square Algorithm, the least significant bit in the power Y, denoted $B_1$, corresponds to the first power of X, the second bit $B_2$ corresponds to the second power of X, the third bit $B_3$ corresponds to the fourth power of X, and so forth until the last bit $B_L$ is reached. Each successive square, $X_1, X_2, X_3 \ldots X_n$, is used to multiply the accumulated value Z depending on the value of the corresponding bit $B_n$ in the power Y. In particular, the accumulated value Z is multiplied by the successive square when the corresponding bit $B_n$ in the power Y is 1. Successive squares corresponding to "0" bits in the power Y do not multiply the accumulated value Z. The Successive Squares Algorithm reduces the number of values that need to be multiplied from $2^{2,048}$ to the order of 2,048 where X and Y are 2048 bits in length.

After each multiplication or squaring operation, the accumulated value Z has a word length in the order of 4,096 bits. In encryption and decryption this accumulated value Z is reduced by modulo reduction to a value in the order of 2,048 bits in length. In particular, the result of each squaring operation is reduced modulo the encryption modulus N of word length 2048. This requires subtracting a number of multiples of N until the value of the accumulated total Z is less than N. The number of multiples of N which have to be subtracted is in the order of $2^{2,048}$ or $10^{600}$ which eliminates the possibility of successive subtraction.

The Modulo Reduction Algorithm is used to reduce a first large number modulo a second large number. According to the Modulo Reduction Algorithm, the approximate reciprocal of N is computed to 2,048 significant bits, ignoring leading zeros after the binary point. Each time a 4,096 bit Z value is to be reduced modulo N, the approximate number of times T that N would have to be subtracted from Z is calculated using the equation T=Z1/N, which is a single long multiplication of Z with the approximate reciprocal of N. The product of TxN is then subtracted from the accumulated value Z which will reduce Z to within one or two times N of the required result. The reduction is then completed by subtracting encryption modulus N one or two times more from the accumulated value Z until the remainder is less than N but not negative. This Modulo Reduction Algorithm requires two long multiplications and two subtractions instead of $10^{600}$ successive subtractions.

According to the present invention, an insecure processor or accelerator 100 is used to perform the bulk of cryptographic calculations without divulging secret information in the process. One embodiment of the present invention can be used, for example, to exponentiate a value with a secret exponent. Thus, the first embodiment may be used, for example, to decrypt an enciphered message without divulging either the private key $K_{PRIV}$ or the plaintext of the message. This embodiment of the invention may also be used to sign a non-secret message with the private key $K_{PRIV}$, again without revealing the private key $K_{PRIV}$. Another embodiment may be used to exponentiate a secret value with a secret exponent. This embodiment may be used, for example, to encrypt secret information using a public key $K_{PUB}$ or private key $K_{PRIV}$ without divulging the secret information or the key.

In the first embodiment of the invention, the private key $K_{PRIV}$ is to remain secret while performing cryptographic calculations. The cryptographic calculations may comprise encrypting or decrypting messages with the private key $K_{PRIV}$. In order to protect the private key $K_{PRIV}$ but still allow a significant portion of the processing required for encryption/decryption to be done outside the security module 20, the private key is divided into two or more parts, sometimes referred to herein as partial values. In the first exemplary embodiment, the private key $K_{PRIV}$ is modified to obtain a modified private key $K_{PRIVM}$ (the first partial value) and indicator INDIC (the second partial value). The security module 20 supplies the modified private key $K_{PRIVM}$ and bitstring X to an insecure processor external to the security module 20, such as accelerator 100. The accelerator 100 performs a significant portion of the necessary calculations based on $K_{PRIVM}$ and supplies a resulting value (referred to herein as the first product $P_1$) to the security module 20. In addition, the accelerator 100 may also supply the security module 20 with other values needed by the security module 20 to complete the calculations. The security module 20 then performs some additional calculations based on the indicator INDIC and bitstring X to produce a second value (referred to herein as the second product $P_2$). The security module 20 then combines the first product $P_1$ and the second product $P_2$ in an appropriate fashion to produce a final product $P_F$. In the case of decryption, the final product $P_F$ is the original plaintext. In the case of encryption, the final product $P_F$ is the resulting ciphertext.

Figure 3:
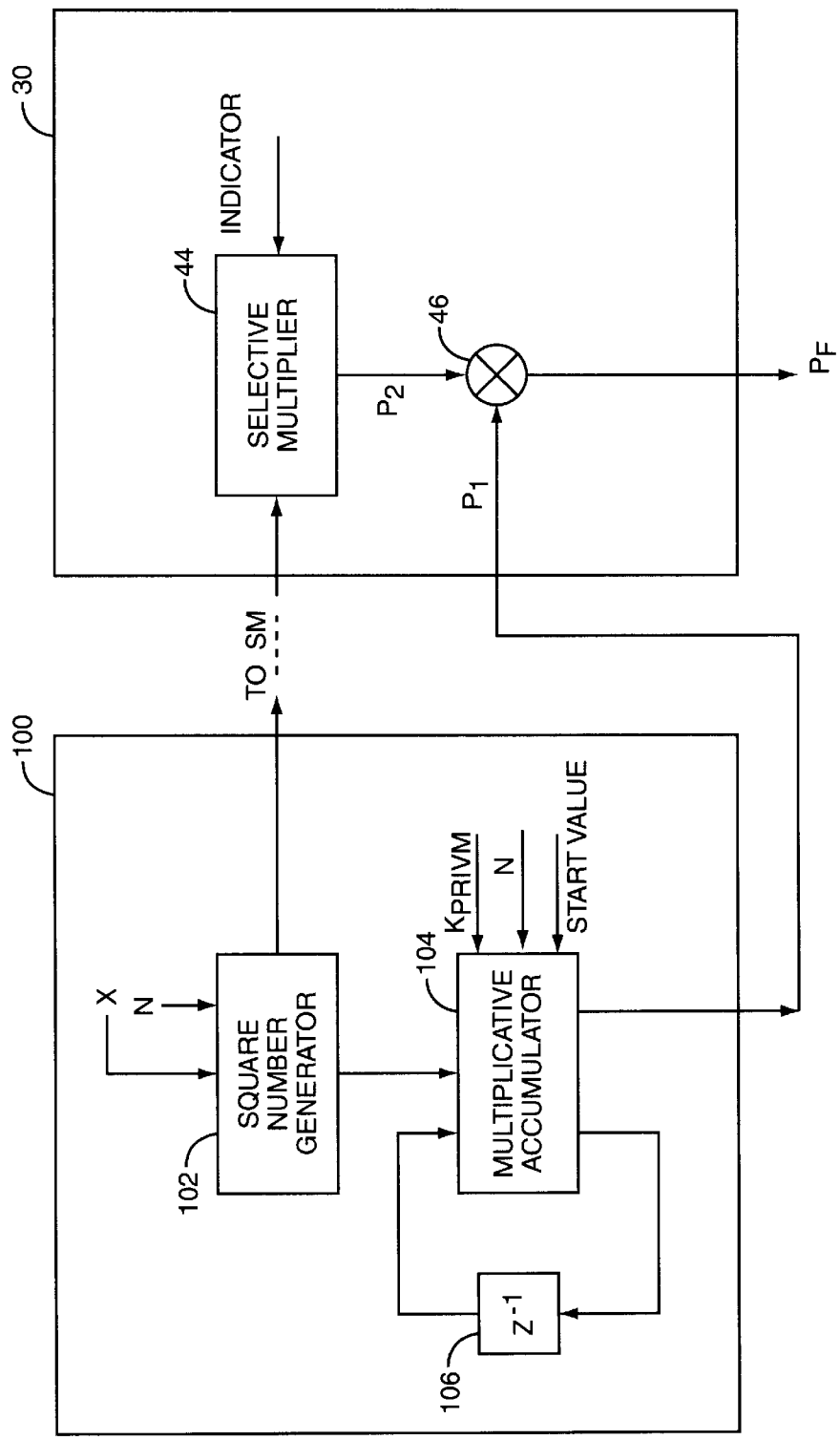
FIG. 3 is a functional block diagram illustrating the processing performed by the insecure processor and the secure processor.

FIG. 3 is a functional block diagram illustrating the processing performed by the accelerator 100 and secure processor 30 for one embodiment. Accelerator 100 comprises a square number generator 102, accumulator 104, and delay circuit 106. Square number generator 102 receives the supplied bitstring X as input. The bitstring X may comprise either the ciphertext to be decrypted with the private key $K_{PRIV}$, or plaintext to be encrypted with the private key $K_{PRIV}$. Square number generator 102 iteratively squares the supplied bitstring X and reduces each successive square modulo an encryption modulus N. The successive squares are denoted as $X_1, X_2, \ldots X_n$. The encryption modulus N is the modulus associated with the supplied private key $K_{PRIV}$. The output of square number generator 102 is supplied to accumulator 104 during each iteration. The output of square number generator 102 is also fed back to the secure processor 30 during each iteration.

Multiplicative accumulator 104 is initialized to a starting value of 1. As mentioned above, multiplicative accumulator 104 receives the successive squares $X_1, X_2, X_3, X_4 \ldots X_n$ output from the square number generator 102. Multiplicative accumulator 104 also receives at a second input an accumulated value Z delayed by one cycle by delay circuit 106. Multiplicative accumulator 104 iteratively multiplies the previous accumulated value Z by the output of the square number generator 102, depending on the value of a corresponding bit $B_n$ of the modified private key $K_{PRIVM}$. Thus, the bits of the modified key $K_{PRIVM}$ control the operation of the multiplicative accumulator 104. When the corresponding bit $B_n$ of the modified key equals 0, the accumulated value Z is multiplied by 1, i.e., no multiplication need be performed. When the corresponding bit $B_n$ of the modified key $K_{PRIVM}$ has a value of 1, the multiplicative accumulator 104 multiplies the previous value Z by a corresponding successive square $X_n$ output from square number generator 102 to compute a new value of Z. After each multiplication operation, the resulting value of Z is reduced modulo the encryption modulus N. This process is repeated for each bit of the modified key $K_{PRIVM}$, beginning with the least significant bit and ending with the most significant bit. The final value of Z is the first product $P_1$ and is input to the security module 20 to complete the cryptographic calculations.

FIG. 3 also shows the processing performed by the secure processor 30 within security module 20 which completes the calculations started by the accelerator 100. Processor 30 comprises a selective multiplier 44 and product node 46. Selective multiplier 44 receives the successive squares $X_1$, $X_2$, ... $X_n$ output from the square number generator 102. Selective multiplier 44 also receives the indicator INDIC discussed further below. The operations of the selective multiplier 44 are controlled by the indicator INDIC. There is a one-to-one correspondence between the bits in INDIC and the number of successive squares $X_n$. In particular, the selective multiplier 44 selects those instances of the successive squares $X_n$ that correspond to a bit value of 1 in the indicator INDIC and discards the successive squares that correspond to a bit value of 0. The selected successive squares $X_n$ may be saved in RAM 40. Thus, the indicator INDIC selects successive squares $X_n$ output by the square number generator 102 and discards the rest.

The selective multiplier 44 may compute the product of the selected successive squares $X_n$ to produce a value referred to herein as the second product $P_2$, which is supplied to product node 46. The product node 46 multiplies the second product $P_2$ by the first product $P_1$ generated by the accelerator 100 to produce the final product $P_F$. This final product $P_F$ comprises the plaintext (decryption), or ciphered text (encryption), resulting from the ciphering operation. Alternatively, the first product $P_1$ output by the accelerator 100 can be multiplied by the selected successive squares $X_n$ one at a time to compute the final product $P_F$. For purposes of this application, multiplying a first product $P_1$ by a second product $P_2$ includes multiplying the first product $P_1$ by the factors that comprise the second product $P_2$. Also, determining or computing a second product $P_2$ as used herein includes determining or computing the factors of the second product $P_2$.

Figure 4:
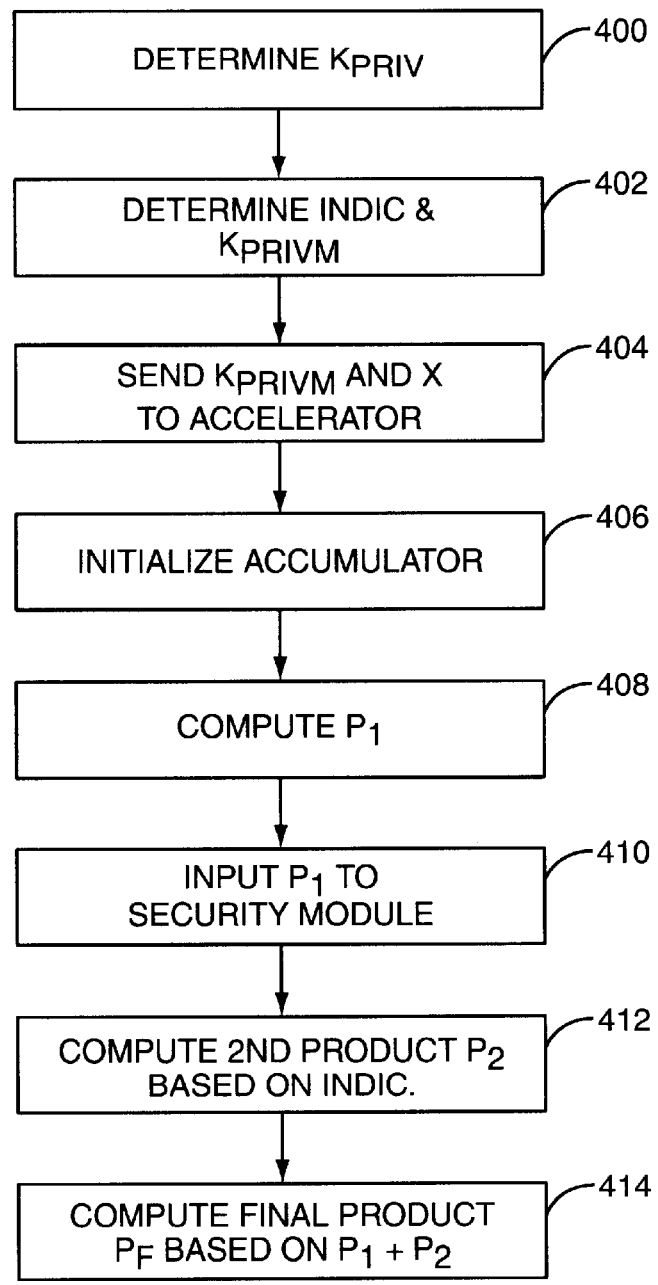
FIG. 4 is a flowchart illustrating a method of performing cryptographic calculations according to one embodiment of the present invention.

FIG. 4 illustrates the steps involved in decrypting an enciphered message using the recipient's private key $K_{PRIV}$ which is to remain secret. The security module 20 determines the private key $K_{PRIV}$ at step 400. In order to use the external accelerator 100 without divulging the private key $K_{PRIV}$, the private key $K_{PRIV}$ is modified by changing selected bits of the original private key $K_{PRIV}$ to obtain a modified private key $K_{PRIVM}$ (step 402). An indicator INDIC is then formed to indicate the changes made to the private key $K_{PRIV}$ (step 402) The indicator INDIC comprises the same number of bits as the private key $K_{PRIV}$.

Numerous methods can be used to compute the modified private key $K_{PRIVM}$ and indicator INDIC. By way of example, a private key $K_{PRIV}$ having a length of 2048 bits has an average of 1024 bit positions with a value of "1". Twenty of these bit positions may be changed from "1" to "0" to form $K_{PRIVM}$. The indicator INDIC in this case comprises a bitstring of equal length to the private key $K_{PRIV}$ having a "1" in each bit position corresponding to the changed bits in the private key $K_{PRIV}$ and zeros elsewhere.

Other methods may also be used to generate $K_{PRIV}$ and indicator INDIC, including replacing some ones by zeros or some zeros by ones. One approach is to first construct indicator INDIC by randomly selecting a small percentage of bits in INDIC to contain binary ones, and then subtracting INDIC from the private key $K_{PRIV}$ with borrow propagation to obtain the modified private key $K_{PRIVM}$. Similarly, bits in $K_{PRIV}$ can be randomly selected and changed, either from "1" to "0" or from "0" to "1", to obtain a modified private key $K_{PRIVM}$ with a value less than $K_{PRIV}$. The modified private key $K_{PRIVM}$ can then be subtracted from the original private key $K_{PRIV}$ to obtain the indicator INDIC. In general, the modified private key $K_{PRIVM}$ and indicator INDIC are chosen such that the sum of the modified private key $K_{PRIVM}$ and indicator INDIC equals the value of the private key $K_{PRIV}$.

For decryption, the enciphered bitstring, denoted X, is supplied to the accelerator 100, along with the modified private key $K_{PRIVM}$ and modulus N (block 404). Accelerator 100 computes the first product $P_1$ as a function of the modified private key $K_{PRIVM}$ and bitstring X using the Successive Squares Algorithm and Modulo Reduction Algorithm. Multiplicative accumulator 104 is initialized (block 406) by setting the value Z of the multiplicative accumulator 104 to a starting value of "1." The first product $P_1$ is then computed by modulo exponentiation of X using the modified private key $K_{PRIVM}$ (block 408). For each bit $B_n$ in the modified private key $K_{PRIVM}$, the value Z is multiplied by a corresponding successive square $X_n$ of the enciphered bitstring X in dependence on the value of the current bit $B_n$ in $K_{PRIVM}$. If the bit $B_n$ has a value "1", accumulator 104 increments Z according to the equation $Z=Z*X^{2^{n-1}}$ where X is equal to the value of the supplied bitstring, and n is the bit position. $X^{2^{n-1}}$ is the successive square of X corresponding to bit $B_n$ of $K_{PRIVM}$. If $B_n$ is "0",the accumulated value Z remains the same. The accumulation process continues for each bit $B_n$ within the modified private key $K_{PRIVM}$. After the last bit $B_L$ in $K_{PRIVM}$ is processed, the final value of Z is then sent to the security module 20 (block 410) as the first product $P_1$.

Each successive square $X_n$, e.g., $X_1$, $X_2$, ... $X_n$, is fed back from the external accelerator 100 to the security module 20. The tamper-proof chip 20 saves the successive squares Xn corresponding to the "1s" in the indicator INDIC and discards the rest in a manner that conceals to the outside world which of the successive squares $X_n$ were saved and which were discarded. The saved successive squares $X_n$ are then multiplied together by secure processor 30 to obtain a second product $P_2$ (block 412).

The first product $P_1$ output by the external accelerator 100 is multiplied by the second product $P_2$ to obtain a final product $P_F$ (step 414). This final step is performed by the secure processor 30. Equivalently, first product $P_1$ can be multiplied by each of the saved successive squares $X_n$ independently to obtain the final product $P_F$. Thus, the second product $P_2$ does not need to be computed separately.

A party observing the external calculations would not know which of the "0s" in the modified private key $K_{PRIVM}$ should have been "1s." The number of different ways in which twenty "1s" could have been changed to "0s" is in the order of $10^{42}$ and, therefore, cannot reasonably be determined by trial and error. Nevertheless, external accelerator 100 may perform 98% or more of the required multiplications.

FIG. 5 illustrates an example of a cryptographic calculation (without modulo reduction) according to the present invention using a five-bit $K_{PRIV}$ and five-bit bitstring X. As illustrated in the example of FIG. 5, $K_{PRIV}$=10111=23. Modified private key $K_{PRIVM}$ is obtained by changing bits at positions 2 and 3 from "1" to "0" where bit position 1 corresponds to the least significant bit. Thus, the modified private key $K_{PRIVM}$=10001=17. Indicator INDIC has a value of "1" at bit position 2 and 3 and zeros elsewhere. Thus, INDIC=6.

The least significant bit of $K_{PRIVM}$ has a value "1". Therefore, the multiplicative accumulator 104 multiplies the starting value of Z (which is 1) by X. The ending value of Z after the initial iteration is therefore X. The second bit in $K_{PRIVM}$ is 0. Therefore, the accumulated value Z is not multiplied during the second iteration. Similarly, bits 3 and 4 of $K_{PRIVM}$ contain zeros so the value of Z remains constant during each of those iterations. The bit at position 5 is a "1" so the accumulated value Z is incremented according to the formula $Z=Z*X^{2^{n-1}}$ to obtain a final value of $5.8 \times 10^{23}$. Since this is the last bit, accelerator 100 sends Z to the security module 20 as the first product $P_1$.

Security module 20 determines the successive squares $X_n$ fed back by square number generator 102 corresponding to each bit position within the indicator INDIC that contains a value of "1." In this example, the successive squares $X_2=X^2$ and $X_3=X^4$ are selected by INDIC. The second product $P_2$ therefore equals $X_2*X_3$, which is equal to $2.44 \times 10^8$. A final product $P_F$ is then determined by multiplying the first product $P_1$ by the second product $P_2$, such that final value of $P_F$ is equal to $1.42 \times 10^{32}$.

A second embodiment of the invention may be used to encrypt secret plaintext with either a public or private key without revealing the secret plaintext. To encrypt plaintext using the RSA algorithm, the secret plaintext must be raised to a power represented by the public or private key. According to the present invention, this is done without releasing the secret plaintext to an insecure processor to perform this exponentiation. In the second embodiment, a first product $P_1$ is computed by the accelerator 100 and a second product $P_2$ is computed within the security module 20. The security module 20 then combines the first product $P_1$ and second product $P_2$ to obtain a final product $P_F$. The first product $P_1$ in the second embodiment is a function of a third product $P_3$ computed within the security module 20 and a fourth product $P_4$. The third product is used to initialize the accumulator 104.

According to the second embodiment, the private key $K_{PRIV}$ is first divided into two partial values, referred to herein as the short part $K_{SHORT}$ and the long part $K_{LONG}$. The short part $K_{SHORT}$ may, for example, comprise the least significant bits of the private key $K_{PRIV}$. The long part, $K_{LONG}$ in that case, is the segment comprising the most significant bits in $K_{PRIV}$. By way of example, if the private key $K_{PRIV}$ contains 2,048 bits, the 16 least significant bits may comprise the short part $K_{SHORT}$ and the 2,032 most significant bits may comprise the long part $K_{LONG}$. The long part $K_{LONG}$ is then modified as described above to obtain a modified long part $K_{LONGM}$ and indicator INDIC. Thus, the private key $K_{PRIV}$ is effectively divided into three partial values: $K_{SHORT}$, $K_{LONGM}$, and INDIC whose sum equals $K_{PRIV}$.

The secret plaintext X is initially encrypted using the short part $K_{SHORT}$ within the security module 20 and the result is the third product $P_3$. The third product $P_3$ is used to initialize the multiplicative accumulator 104, and is referred to herein as the starting value. This is done by modulo exponentiation of the secret plaintext X using the short part $K_{SHORT}$ of the private key $K_{PRIV}$. Modulo exponentiation may be performed using the Successive Squares Algorithm and Modulo Reduction Algorithm as previously described. This process necessarily requires that the secure processor 30 compute the first sixteen successive squares of X. The last of the 16 successive squares computed, denoted $X_{16}$, would be the plaintext raised to the power of 32,768 reduced modulo the encryption modulus N.

The value $X_{16}$ is released to the accelerator 100 which uses $X_{16}$ to initialize the square number generator 102. The square number generator 102 computes the final 2,032 successive squares of X by successively squaring $X_{16}$. Multiplicative accumulator 104, which is initialized to the value of the third product $P_3$, computes the first product $P_1$ as a function of the third product $P_3$ and modified long part $K_{LONGM}$ of the private key $K_{PRIV}$ using the Successive Squares Algorithm and Modulo Reduction Algorithm, as previously described. Thus, according to the present invention, it is not necessary to release the secret plaintext X to the outside world but, instead, it is only necessary to release $X_{16}$. Attempts to compute X based on $X_{16}$ would require a 1/32,768th root operation, which is not practically possible in modulo arithmetic. Therefore, the disclosure of $X_{16}$ and $P_3$ does not disclose X to the outside world.

Figure 6:
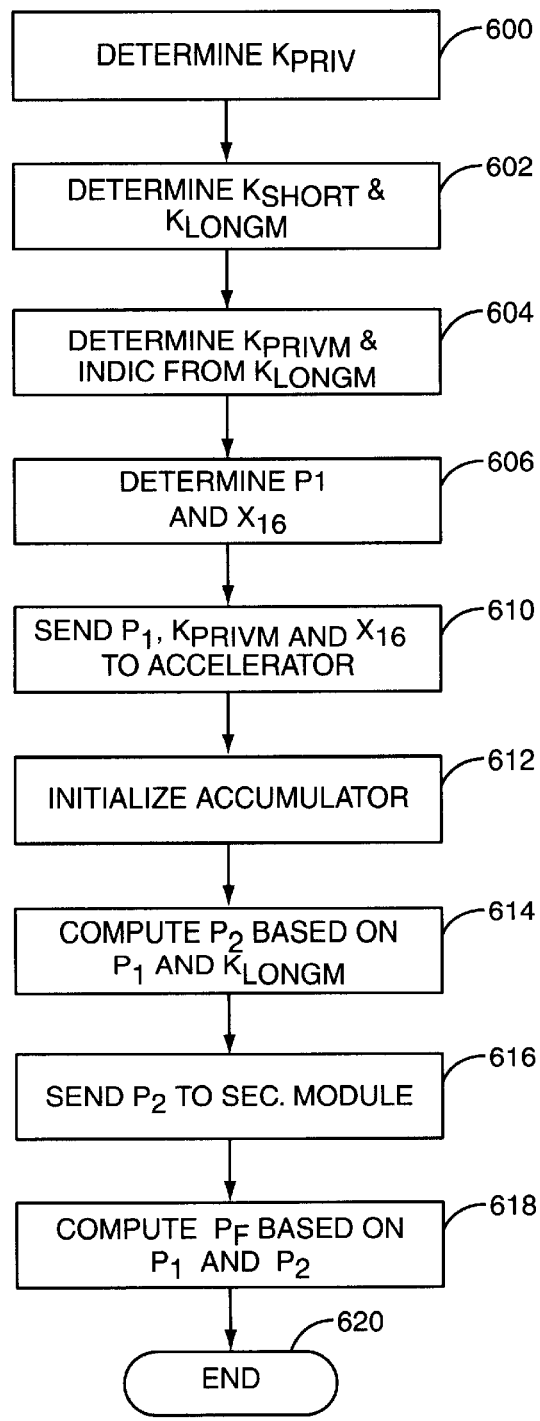
FIG. 6 is a flowchart illustrating an alternative method of performing cryptographic calculations according to a second embodiment of the present invention.

FIG. 6 illustrates the method of encryption according to the second embodiment of the present invention. The value of the private key $K_{PRIV}$ is determined and stored within the security module 20 (block 600). Two additional values, $K_{SHORT}$ and $K_{LONG}$ are next determined (block 602) by splitting the private key $K_{PRIV}$ into two parts. $K_{SHORT}$ comprises the 16 least significant bits, and $K_{LONG}$ comprises the 2,032 most significant bits. The value $K_{LONG}$ is then modified in the manner previously described to obtain $K_{LONGM}$ and an indicator INDIC (block 604).

The value $K_{SHORT}$ is maintained within the security module 20 and is used to exponentiate the secret plaintext, denoted X, to obtain the third product $P_3$. The value X is raised to the power $K_{SHORT}$ within the security module 20 by processor 30 using the Successive Squares Algorithm and Modulus Reduction Algorithm to obtain the third product $P_3$ and the value $X_{16}=X^{65536}$ (block 606). The third product is X raised to the power of $K_{SHORT}$ and reduced modulo N (e.g. $P_1 = X^{KSHORT}$ mod N). The values $K_{LONGM}$, $P_3$, and $X_{16}$ are output to the accelerator 100 (block 610). Multiplicative accumulator 104 is initialized to the value $P_3$ (block 612). From this point, the process continues as descried above with respect to FIG. 4. The square number generator 102 computes the successive squares $X_n$ of X beginning with $X_{17}$ and continuing to $X_{2048}$. Each of the successive squares $X_n$ is computed by squaring the previous value. Thus, $X_{17}$ is computed by squaring $X_{16}$, $X_{18}$ is computed by squaring $X_{17}$, and so on until $X_{2048}$ is reached. Each of the successive squares, e.g. $X_{17}$, $X_{18}$, . . . $X_n$, is fed back to the security module 20, which saves those successive squares $X_n$ corresponding to ones in the indicator INDIC to compute the second product $P_2$. The successive squares $X_n$ are also input to the accumulator 104 which multiplies the accumulated value Z by the successive square $X_n$ when a corresponding bit $B_n$ in $K_{LONGM}$ is equal to 1 as previously described. The multiplicative accumulator 104 effectively multiplies the third product $P_3$ by a fourth product $P_4$, which equals the bitstring X raised to the power of $K_{LONGM}$. The final value of the accumulator 104, denoted as the first product $P_1$, is returned to the security module 20. The security module 20 computes a second product $P_2$, which is the bitstring X raised to the power of the indicator INDIC. The final product $P_F$ is then obtained by multiplying the first product $P_1$ by the second product $P_2$.

It should be appreciated that the bitstring $K_{LONGM}$ and $K_{SHORT}$ is equivalent to the modified cipher key in the first embodiment. That is, $K_{LONGM}+K_{SHORT}=K_{PRIVM}$ in the first embodiment. Thus, the first product $P_1$ in the second embodiment could also be expressed as a function of $K_{LONGM}$ and $K_{SHORT}$. More specifically, the first product $P_1$ is related to $K_{LONGM}$ and $K_{SHORT}$ by the following equation:

$$P_1 = X^{K_{LONGM}+K_{SHORT}} = (X^{K_{LONGM}})(X^{K_{SHORT}}).$$

$X^{K_{SHORT}}$ is the third product $P_3$ and $X^{K_{LONG}}$ is the fourth product $P_4$.

The above protocol is safe for encryption of secret plaintext using the private key $K_{PRIV}$ as well as for usual decryption of enciphered text using the private key $K_{PRIV}$. When the communication terminal 10 is used for both encryption and decryption, the same modifications of the private key $K_{PRIVM}$ should be used for both operations.

FIG. 7 illustrates an example of a cryptographic calculation without modulo reduction according to the second embodiment using a 5-bit private key $K_{PRIV}$ and a 5-bit value X. As illustrated in the example of FIG. 7, $K_{PRIV}$ equals 10111=23. $K_{LONGM}$ equals 10000=16. $K_{SHORT}$ equals 00011=3. Indicator INDIC equals 00100=4.

The starting value of the accumulator 104 is computed by the security module 20 by raising the value of the bitstring X to the power of $K_{SHORT}$ which equals 15,625, which is the third product $P_3$. In this example, $K_{SHORT}$ comprises the first two bits of $K_{PRIV}$ with the remaining bits set to 0. Thus, the security module 20 also computes the first two successive squares of X, i.e., $X_1=X$ and $X_2=X^2$. The last successive square, $X_2$, is used to initialize the square number generator 102. The accelerator 100 then computes the first product $P_1$ as a function of the third product $P_3$ and the modified long part $K_{LONGM}$ of the private key $K_{PRIV}$. In this example, the first four bits of $K_{LONGM}$ are equal to 0. Therefore, the first four successive squares of X do not multiply the accumulated value X. The final bit of $K_{LONGM}$, which corresponds to $X^{16}$, has a value of 1. Therefore, the accumulated value Z is multiplied by $2.32 \times 10^{22}$, the fourth product $P_4$, to arrive at the first product $P_1$ equal to $3.64 \times 10^{26}$.

The first product $P_1$ is input to the security module 20. The security module 20 computes the second product $P_2$, which in this example equals 390,625. The first product $P_1$ and second product $P_2$ are multiplied to obtain the final product $P_F$, which equals $1.42 \times 10^{32}$.

The second embodiment effectively divides the private key $K_{PRIV}$ into three parts: a short or least significant part $K_{SHORT}$, a modified most significant part $K_{LONGM}$, and an indicator INDIC. Exponentiation using the least significant part $K_{SHORT}$ takes place inside the security module 20, while exponentiation with the modified most significant part $K_{LONGM}$, which comprises the bulk of the multiplications, is performed by accelerator 100. A person skilled in the art will realize that there are other ways to partition the secret key to obtain the same objectives.

As an example, the above-described process is applied to an exemplary secret key as follows:

| | |
|---|---|
| $K_{PRIV}$ | 11011001011101 |
| $K_{LONG}$ | 11011001010000 |
| $K_{SHORT}$ | 00000000001101 |
| $K_{LONGM}$ | 11000000010000 |
| INDIC | 00011001000000 |

In this case, the private key $K_{PRIV}$ can be expressed as 16 ($K_{LONGM}$ OR INDIC)+$K_{SHORT}$. However, an alternative division of the private key $K_{priv}$ can be made as follows:

| | |
|---|---|
| $K_{PRIV}$ | 11011001011101 |
| $K_{LONG}$ | 11011001010000 |
| $K_{SHORT}$ | 00000000001101 |
| $K_{LONGM}$ | 11010110010000 |
| INDICI | 00000011000000 |

In this case, the private key $K_{PRIV}$ can be expressed as 16 ($K_{LONGM}$+INDIC)+$K_{SHORT}$.

Note that the latter formula embraces the former but allows additional ways to modify the $K_{LONG}$. That is, in the first example, the only permitted bit change in $K_{LONG}$ is from a binary "1" to a binary "0". In the second example, a "0" in $K_{LONG}$ can be replaced by a "1" by subtracting binary "1" from that position with forward borrow propagation. Likewise, a "1" in $K_{LONG}$ may be converted to a "0" by addition of a "1" to that position with forward carry propagation. Whatever is done to $K_{LONG}$ (increment or decrement a bit position with carry/borrow propagation), the opposite is done to the indicator INDIC so that their sum of $K_{LONGM}$ and INDIC continues to be equal to the unmodified long part $K_{LONG}$. Thus, "1"s may be converted to "0"s, either by decrementing them in $K_{LONG}$ and incrementing the corresponding position in INDIC without carry/borrow propagation, or else by incrementing them with carry propagation in $K_{LONG}$ while decrementing the corresponding position in INDIC with borrow propagation. Conversely, "0"s in $K_{LONG}$ may be converted to "1"s either by incrementing that position in $K_{LONG}$ while decrementing (with borrow propagation) the corresponding bit position in INDIC or else by decrementing (with carry propagation) that position in $K_{LONG}$ while incrementing the corresponding bit position in INDIC.

It may not be necessary to use the insecure processor 100 for operations involving the public key $K_{PUB}$, since public keys are generally much shorter (less than 16 bits) than private keys. However, the present invention may also be used to encrypt secret plaintext with the public key $K_{PUB}$ by performing exponentiation of the secret plaintext with a least significant portion of the public key $K_{PUB}$ and completing the exponentiation with the most significant part of the public key $K_{PUB}$. The result returned by the insecure processor 100 can then be combined with the value computed within the security module 20. When encrypting secret text with a public key $K_{PUB}$, it is not necessary to modify the bits of the public key $K_{PUB}$ as described above since the public key $K_{PUB}$ is already public. Thus, a third embodiment of the invention involves encrypting plaintext by splitting the encryption key into two parts, performing a first part of the encryption operation within a secure processor, performing a second part of the encryption operation in an insecure processor, and combining the results within the secure processor.

The present invention may be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for performing calculations on a bitstring using a secret cipher key, said method comprising:

modifying said cipher key to obtain a modified cipher key;

generating an indicator corresponding to said modified cipher key, said indicator having a plurality of indicator bits;

computing a first product as a function of said bitstring and said modified cipher key in an insecure processor;

computing a second product as a function of said bitstring and said indicator in a secure processor; and computing a final product as a function of said first and second products in said secure processor.

2. The method of claim 1 wherein modifying said cipher key to obtain a modified cipher key comprises changing randomly selected bits of said cipher key to obtain said modified cipher key.

3. The method of claim 2 wherein generating an indicator corresponding to said modified cipher key comprises computing the additive complement of said modified cipher key that, when added to said modified cipher key, yields said cipher key.

4. The method of claim 1 wherein computing said first product as a function of said bitstring and said modified cipher key in said insecure processor comprises performing modulo exponentiation of said bitstring using said modified cipher key as an exponent.

5. The method of claim 4 wherein computing said second product as a function of said bitstring and said indicator in said secure processor comprises selecting one or more successive squares of said bitstring based on said indicator, said second product comprising the product of said selected successive squares.

6. The method of claim 5 wherein computing said final product as a function of said first and second products in said secure processor comprises multiplying said first and second products.

7. The method of claim 1 wherein computing said first product as a function of said is bitstring and said modified cipher key by said insecure processor comprises computing said first product as a function of a third product computed by said secure processor, and a fourth product, wherein said third product is a function of said bitstring and a short part of said cipher key, and wherein said fourth product is a function of said bitstring and a modified long part of said cipher key.

8. A method for performing calculations using a secret bitstring and a cipher key using an insecure processor, said method comprising:

dividing said cipher key into first and second parts;

computing, in a secure processor, a third product as a function of said bitstring and said first part of said cipher key;

outputting said third product to said insecure processor;

modifying said second part of said cipher key with said secure processor to obtain a modified second part of said cipher key;

generating an indicator corresponding to said modified second part of said cipher key;

computing a first product with said insecure processor as a function of said third product and said modified second part of said cipher key;

computing a second product with said secure processor as a function of said bitstring and said indicator; and computing a final product with said secure processor as a function of said first product and said second product.

9. The method of claim 8 wherein dividing said cipher key into first and second parts comprises dividing said cipher key into a least significant part and a most significant part.

10. The method of claim 9 wherein computing said third product as a function of said bitstring and said first part of said cipher key comprises computing said third product as a function of said bitstring and said least significant part of said cipher key.

11. The method of claim 10 wherein modifying said second part of said cipher key with said secure processor to obtain said modified second part of said cipher key comprises modifying said most significant part of said cipher key.

12. The method of claim 11 wherein computing said first product with said insecure processor as a function of said third product and said modified second part of said cipher key comprises selecting successive squares of said bitstring based on said modified second part of said cipher key, and multiplying said third product by said selected successive squares.

13. The method of claim 11 wherein computing said second product with said secure processor as a function of said bitstring and said indicator comprises selecting one or more successive squares of said bitstring based on said indicator, said second product comprising the product of said selected successive squares.

14. A computing device for exponentiating a bitstring with a secret exponent, said computing device comprising a secure processor and an insecure processor, wherein said secure processor is programmed to:

divide said secret exponent into a plurality of partial values comprising a least a first partial value and a second partial value such that the sum of said plurality of partial values is equal to said exponent;

output said first partial value to an insecure processor;

receive a first product from said insecure processor computed as a function of said bitstring and said first partial value;

compute a second product as a function of said second partial value and said bitstring; and compute a final product as a function of said first product and a second product.

15. The device of claim 14 wherein said first product computed by said insecure processor comprises said bitstring raised to the power of said first partial value.

16. The device of claim 15 wherein said second product computed by said secure processor comprises said bitstring raised to the power of said second partial value.

17. The device of claim 16 wherein said final product comprises the product of said first and second products.

18. The device of claim 14 wherein said first product computed by said insecure processor is further computed as a function of a third product.

19. The device of claim 18 wherein said third product is computed by said secure processor as a function of a third partial value and said bitstring.

20. The device of claim 19 wherein said third product comprises said bitstring raised to the power of said third partial value.

21. The device of claim 20 wherein said first product comprises said third product multiplied by a fourth product.

22. The device of claim 21 wherein said fourth product comprises said bitstring raised to the power of said first partial value.

* * * * *